United States Patent [19]

Lim et al.

[11] Patent Number: 5,212,605

[45] Date of Patent: May 18, 1993

[54] EJECTING AND LOADING MECHANISM FOR A TAPE CASSETTE WITH MEANS FOR PREVENTING UNINTENTIONAL EJECTION OF THE CASSETTE

[75] Inventors: Jong R. Lim; Jong G. Choi, both of Seoul, Rep. of Korea

[73] Assignee: Goldstar Co., Ltd., Seoul, Rep. of Korea

[21] Appl. No.: 647,927

[22] Filed: Jan. 30, 1991

[30] Foreign Application Priority Data

Jan. 31, 1990 [KR] Rep. of Korea ............... 1123/1990
Jul. 31, 1990 [KR] Rep. of Korea ............. 11416/1990

[51] Int. Cl.5 .................................... G11B 17/04
[52] U.S. Cl. .......................... 360/99.06; 360/96.5; 360/99.02
[58] Field of Search ........... 360/96.5, 99.02, 90, 360/92, 93, 99.06

[56] References Cited

U.S. PATENT DOCUMENTS

| 4,580,182 | 4/1986 | Persiani | 360/96.5 |
| 4,586,097 | 4/1986 | Koike et al. | 360/99.02 |
| 4,628,381 | 12/1986 | Takai | 360/96.5 |
| 4,751,593 | 6/1988 | Yoshimura | 360/96.5 |
| 4,864,440 | 9/1989 | Satoh et al. | 360/99.02 |
| 5,010,484 | 4/1991 | Kobayashi et al. | 360/99.02 |

FOREIGN PATENT DOCUMENTS 1-276414 11/1989 Japan ................. 360/96.5

Primary Examiner—Stuart S. Levy
Assistant Examiner—Alfonso Garcia
Attorney, Agent, or Firm—Rosen, Dainow & Jacobs

[57] ABSTRACT

A tape cassette ejecting and loading mechanism including a top cover, a horizontal carrier movable under the top cover, an ejecting lever supported elastically under the horizontal carrier by a spring for ejecting a tape cassette out of a cassette holder in unloading, and a locking lever mounted to a lower surface of the carrier for rotating the ejecting lever clockwise or anti-clockwise and locking or unlocking the ejecting lever in loading or unloading the cassette. In accordance with the present specifications, the tape cassette ejector includes a safety lever mounted to the middle portion of the horizontal carrier, and elastically supported by a spring to prevent the ejecting lever from rotating anti-clockwise for preventing the cassette from being ejected unintentionally in an initial loading position.

7 Claims, 7 Drawing Sheets

EJECTING AND LOADING MECHANISM FOR A TAPE CASSETTE WITH MEANS FOR PREVENTING UNINTENTIONAL EJECTION OF THE CASSETTE

FIELD OF THE INVENTION

The present invention relates generally to a front loader of DAT (digital audio tape recorder) or VCR (video cassette tape recorder) type, and more particularly, concerns an ejecting and loading mechanism for a cassette which, in loading, can prevent unintentional ejecting of a tape cassette by using a safety lever preventing the rotation of an ejecting lever in the initial loading position, and provide a stable loading action of the cassette by means of a hooking pin secured to an elastic support stem formed at an end of the safety lever and a rounded camming surface formed on an end portion of the ejecting lever.

BACKGROUND OF THE INVENTION

Conventional DAT or VCR type front loaders comprise a pair of brackets mounted vertically and in parallel with each other on the main base, a cassette holder, and a horizontal carrier movable along the brackets to load or unload the cassette. Korean utility model application No. 89-2327 (filed in the name of same applicant on Feb. 28, 1989 and referred in FIGS. 6 to 9) discloses a tape cassette ejector having a pair of brackets 11 secured on both end portions of the main base in parallel with each other, a horizontal carrier 12 movable on the brackets, an ejecting lever 13, a torsion spring 14 supporting the lever 13, a locking lever 15, and a top cover 16. The carrier 12 is mounted, by means of a pin, to a guide hole 11a formed in the brackets 11, and moves horizontally.

Figure 6:
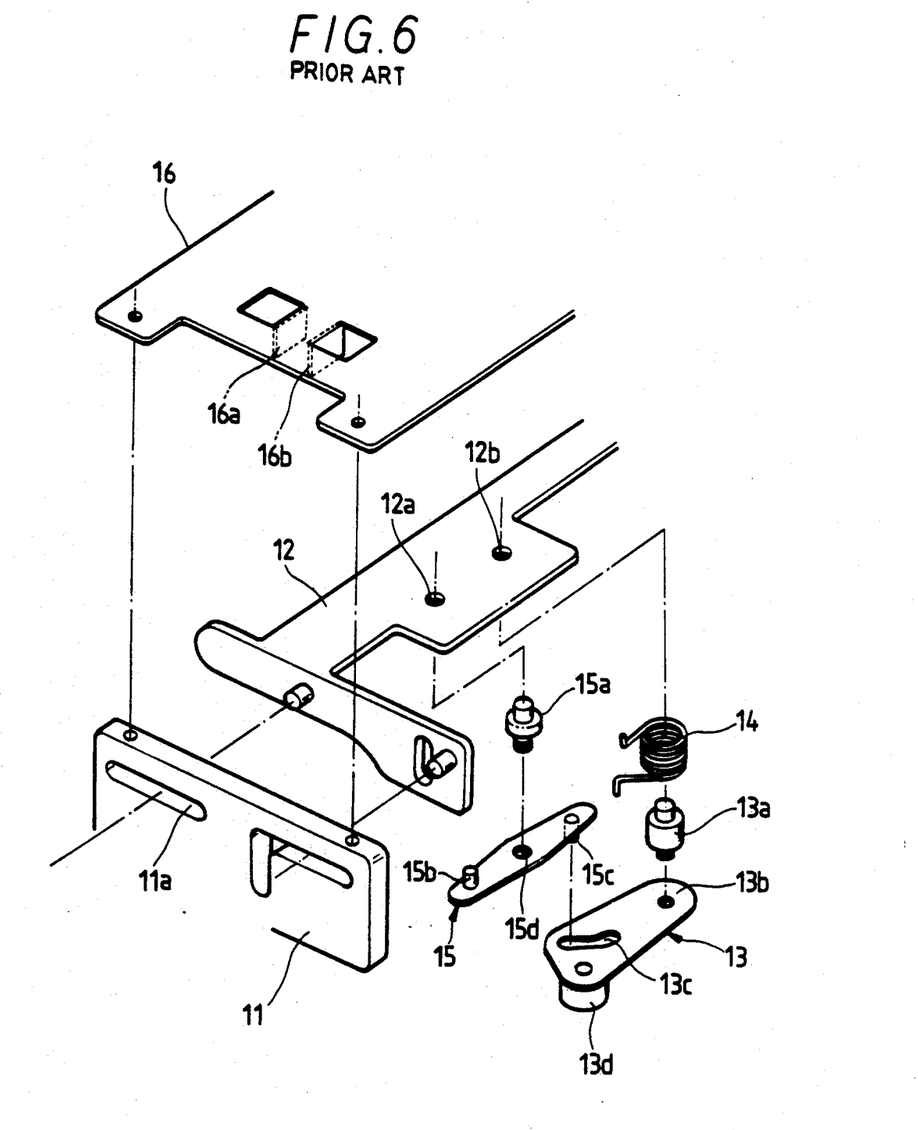
FIG. 6 is an exploded perspective view of a cassette ejector in accordance with a prior art.
Figure 7:
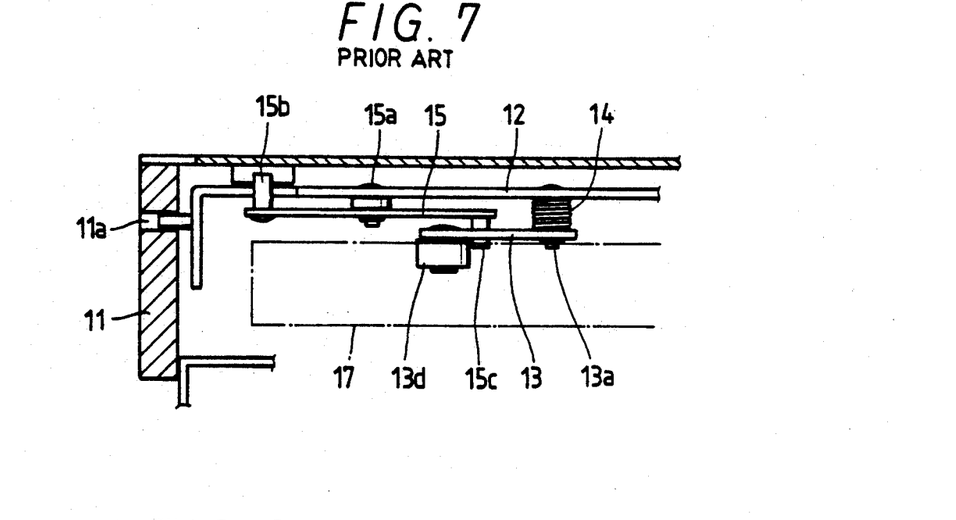
FIG. 7 is a longitudinal sectional view of the cassette ejector shown in FIG. 6, after being assembled.

At a pin 15a secured to a hole 12a of the carrier 12, the lever 15 is mounted rotatably by means of a shaft hole 15d thereof. Also, the ejecting lever 13 is mounted by its shaft hole 13b on a pin 13a secured into a securing hole 12b, and a pin 15c secured downwardly at an end portion of the lever 15 is inserted into a cam slot 13c formed on the other end portion of the lever 13. Also a pin 15b is secured on the other end portion of the locking lever 15, and an ejecting roller 13d is mounted near the cam slot 13c of the ejecting lever 13.

Figure 8A:
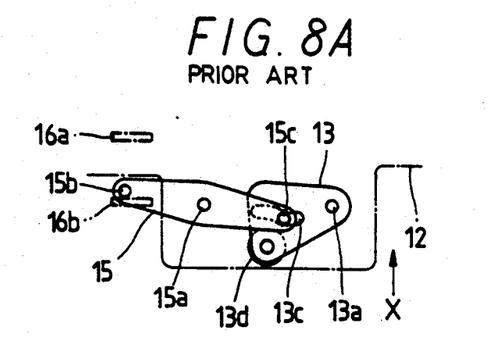
FIGS. 8A and 8B are top views showing the operation of the cassette ejector shown in FIG. 6.
Figure 8B:
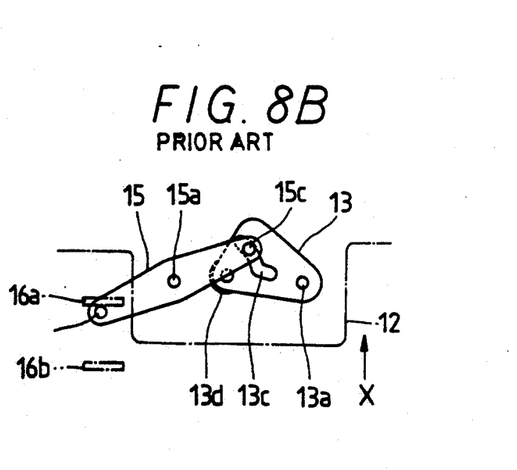
Figure 9:
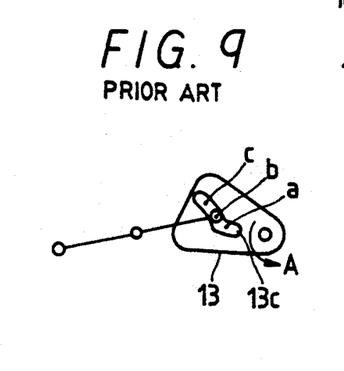
FIG. 9 is a fragmentary top view showing the operation of the cassette ejector shown in FIG. 6.

An end portion of a torsion spring 14 inserted on the shaft pin 13a of the ejecting lever 13 contacts an end portion of the lever 13, and the other portion of the spring 14 contacts an end portion of a top cover 16 secured on the brackets 11 and positioned above the carrier 12. Accordingly, the ejecting lever 13 is supported elastically, and can rotate anti-clockwise around the pin 13a (see FIGS. 8 and 9). A pair of stoppers 16a, 16b extend downwardly from the top cover 16 to contact with the pin 15b for limiting the rotation range of the pin 15b in a given stroke.

In an initial position of the above-mentioned ejector in which the tape cassette 17 is inserted into the cassette holder, the pin 15c of the locking lever 15 is located at the position "a" of the cam slot 13c (see FIGS. 8A and 9), and the lever 13 rotates anti-clockwise (direction "A" in FIG. 9) by means of the torsion spring 14. Accordingly, when the user inserts the cassette 17, the cassette 17 pushes the ejecting roller 13d to rotate the lever 13 in the direction "A", thereafter, a drive motor (not shown) is driven to move the carrier 12 in the loading direction (direction "X"). Therefore, the pin 15b of the locking lever 15 contacts the stopper 16a to shift the pin 15c from position "a" to positions "b" and "c" shown in FIG. 9, and the lever 13 is locked by the locking lever 15.

On the other hand, in unloading, the carrier 12 moves in the unloading direction, and the pin 15b of the locking lever 15 contacts the stopper 16b to rotate said lever 15 clockwise, thereafter, the pin 15c shifts along the positions c→b→a of the slot 13c in regular sequence, and when the pin 15c is located at the last position (position "a"), the state of locking is unlocked, and the ejecting lever 13 moves in the direction "A" to eject the cassette 17.

However, in the initial position of loading the cassette, when the user removes the pushing force, the cassette 17 is ejected out of the holder 10 by the elastic power of the torsion spring 14 acting on the lever 13. In consequence, to prepare a stable loading action, the user has to push the cassette 17 until the pin 15b of the locking lever 15 contacts with the stopper 16a.

SUMMARY OF THE INVENTION

Accordingly, it is the object of the present invention to provide a cassette ejector solving the above-mentioned problems by providing a safety lever having a hooking means which can prevent rotating of the ejecting lever. Therefore, according to the present invention, when the cassette is inserted to a given depth, the loading action can be done without failure.

In accordance with the present invention, this object can be accomplished by providing a tape cassette ejector comprising: a top cover; a horizontal carrier being movable under said top cover; an ejecting lever mounted downwardly to a lower surface of said horizontal carrier, and elastically supported by means of a spring to eject a tape cassette out of a cassette holder in unloading., a locking lever mounted downwardly to said horizontal carrier near said ejecting lever to rotate said ejecting lever clockwise or anti-clockwise, and lock or unlock said ejecting lever in loading or unloading., a safety lever mounted to a middle portion of said carrier, and elastically supported by means of a spring for preventing said ejecting lever from rotating in the anti-clockwise direction to prevent said cassette from being ejected unintentional in an initial loading position.

BRIEF DESCRIPTION OF THE DRAWINGS

The foregoing and further objects, features and advantages of the present invention will be understood more completely from the following detailed description of presently preferred embodiments of the present invention, with reference to the accompanying drawings, in which;

FIGS. 3A to 3E are fragmentary top views showing the operation of the ejector of FIG. 1A;

DETAILED DESCRIPTION OF THE PREFERRED EMBODIMENTS

Figure 1A:
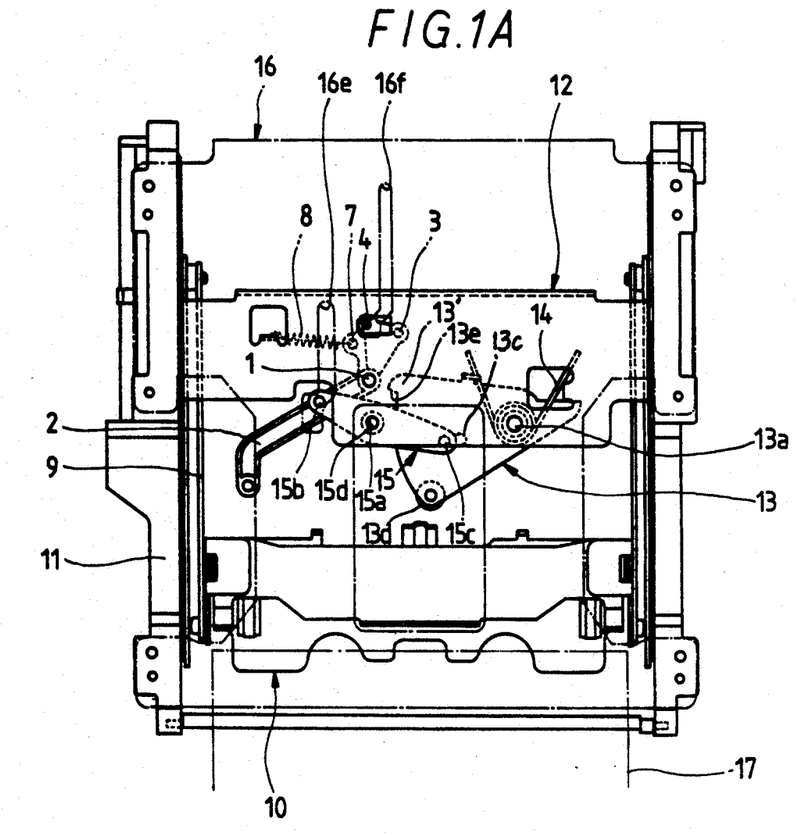
FIG. 1A is a top view of an embodiment of the tape cassette ejector in accordance with the invention.
Figure 1B:
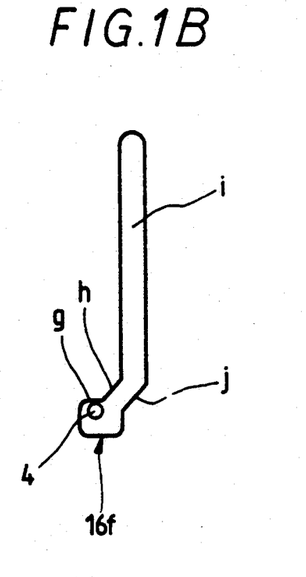
FIGS. 1B and 1C are top views of the first and second guide holes guiding the movement of the safety lever and ejecting lever shown in FIG. 1A.
Figure 1C:
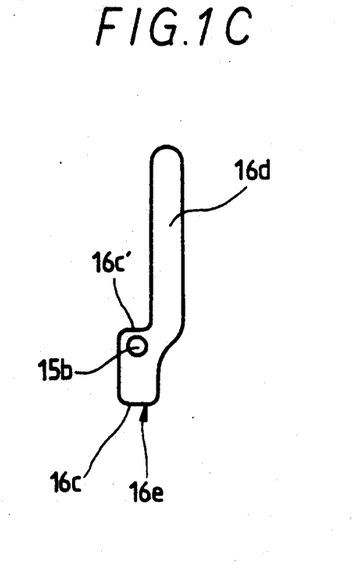
Figure 2:
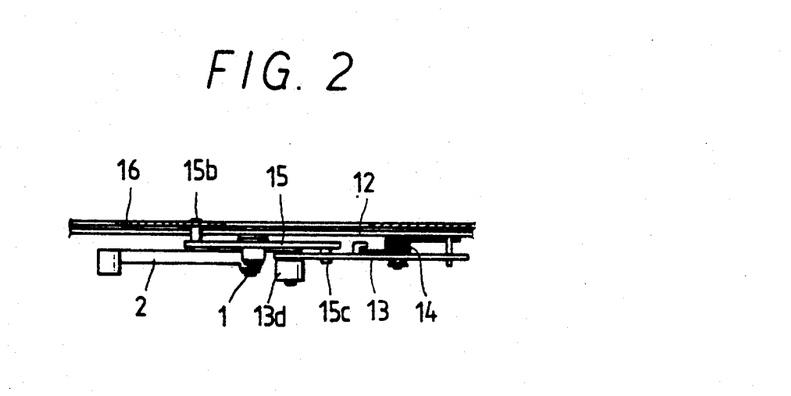
FIG. 2 is a longitudinal sectional view of a connecting portion of a shaft pin and safety lever shown in FIG. 1A.

Referring now to FIGS. 1A to 2, which illustrate a DAT type front loader having a tape cassette ejector, a horizontal carrier 12 is mounted on a pair of brackets 11 positioned in parallel with each other, and can be moved horizontally along the brackets 11. Also a top cover 16 is secured on the brackets 11, and a cassette holder 10 is connected to the carrier 12 through a rotation lever 9.

Such a DAT type front loader is mounted on a deck of the main body, and can be used to load the cassette toward a rotary head drum or to unload the cassette.

When the user inserts a cassette 17 into the cassette holder 10 of the front loader, the cassette holder 10 moves horizontally with the carrier 12 for a given distance. Thereafter, the carrier 12 is stopped, and the holder 10 moves longitudinally. The cassette 17 in said holder 10 is then located on the rotary head drum.

As above mentioned, at the lower surface of the horizontal carrier 12, an ejecting lever 13 having an ejecting roller 13d is mounted to be rotated around the pin 13a, and the lever 13 is supported elastically and is biased in the anti-clockwise direction by means of a torsion spring 14 surrounding the pin 13a. At the lower surface of the carrier 12, a locking lever 15 is also mounted to be rotated around the pin 15a. The ejecting lever 13 has a cam slot 13c in which a pin 15c secured to a lower end portion of the locking lever 15 is inserted. A pin 15b secured on the other end portion of the locking lever, 15 is inserted into a hole 16e in the cover having two stoppers 16c, 16c' (see FIG. 1C) and a loading guide portion 16d. The stoppers 16c, 16c' are formed at an end of the top cover 16, and act to limit the rotation range of the pin 15b.

The safety lever 2 is mounted rotatably to a shaft pin 1 secured to the lower surface of the middle portion of the carrier 12. A front portion of the lever 2 contacts the cassette 17, and a spring 8 is connected to a securing hole 7 of the safety lever 2 to support the lever 2 elastically in the anti-clockwise direction.

A hooking pin 3 is secured to an end portion of the safety lever 2 to be hooked on a hooking portion 13e formed at an end portion of the ejecting lever 13, and a guide pin 4 is secured at the other end portion of the lever 2 to be inserted into a guide hole 16f formed longitudinally at a middle portion of the top cover 16. Said guide hole 16f is comprised of an initial guide portion g, a middle guide portion h, a loading guide portion i, and an unloading guide portion j.

In the drawings, the same parts as those of the above-mentioned conventional device are designated by the same reference numerals.

In operation, at the initial ejecting position of the cassette 17, the pin 15c of the locking lever 15 is positioned at the 'a' position of the cam slot 13c (see FIG. 9), and the ejecting lever 13 is rotated anti-clockwise by means of the torsion spring 14.

At the position shown in FIGS. 3A–E, if the tape cassette 17 is inserted, the cassette 17 pushes the ejecting roller 13d to rotate the ejecting lever 13 clockwise around the pin 13a. Thereafter, the safety lever 2 is also rotated clockwise around the shaft pin 1. At this position, the guide pin 4 of the lever 2 leaves the initial guide portion g, and moves to the middle guide portion H. Thereafter, if the cassette is inserted deeper, the safety lever 2 rotates around the shaft pin 1 to move the guide pin 4 along the middle guide portion h.

Accordingly, the position of the hooking pin 3 is shifted clockwise around the shaft pin 1 due to the rotation of the safety lever 2, and the hooking portion 13e of ejecting lever 13 is hooked on the hooking pin 3. Therefore, the cassette is not ejected unintentionally because the ejecting lever 13 can not be further rotated in the anti-clockwise direction.

Thereafter, when the pin 15b is hooked on the hooking portion 16c' of the guide hole 16e resulting from the continuous moving of the horizontal carrier 12, the pin 15c move from the position 'a' to 'b' and then from the position 'b' to 'c'. Also the ejecting lever 13 is locked by the locking lever 15. Then, when the guide pin 4 is guided in the loading guide portion i of the guide hole 16f, and the pin 15b is guided in the loading guide portion 16d of the guide hole 16e, the horizontal carrier 12 is loaded completely as shown in FIG. 3D.

In unloading, the carrier 12 is operated in an opposite procedure Therefore, the pin 15b of the locking lever 15 contacts the hooking portion 16c of the top cover 16, and then the locking lever 15 is shifted clockwise to unlock the ejecting lever 13. The guide pin 4 of the lever 2 moves in the unloading guide portion j of the guide hole 16f to rotate the lever 2 anti-clockwise around the shaft pin 1, and then the hooking pin 3 is released from the hooking portion 13e of the ejecting lever 13. Therefore, the ejecting lever 13 rotates anti-clockwise around the shaft pine 1 by means of the torsion spring 14, and the cassette 17 is ejected by the action of the ejecting roller 13d.

As mentioned above, in the cassette ejecting and loading mechanism according to the present invention used in the DAT type front loader, when the cassette 17 is inserted to a given depth, the loading of the cassette can be done completely and stably because the safety lever 2 prevents the ejecting lever 13 from rotating.

Figure 3A:
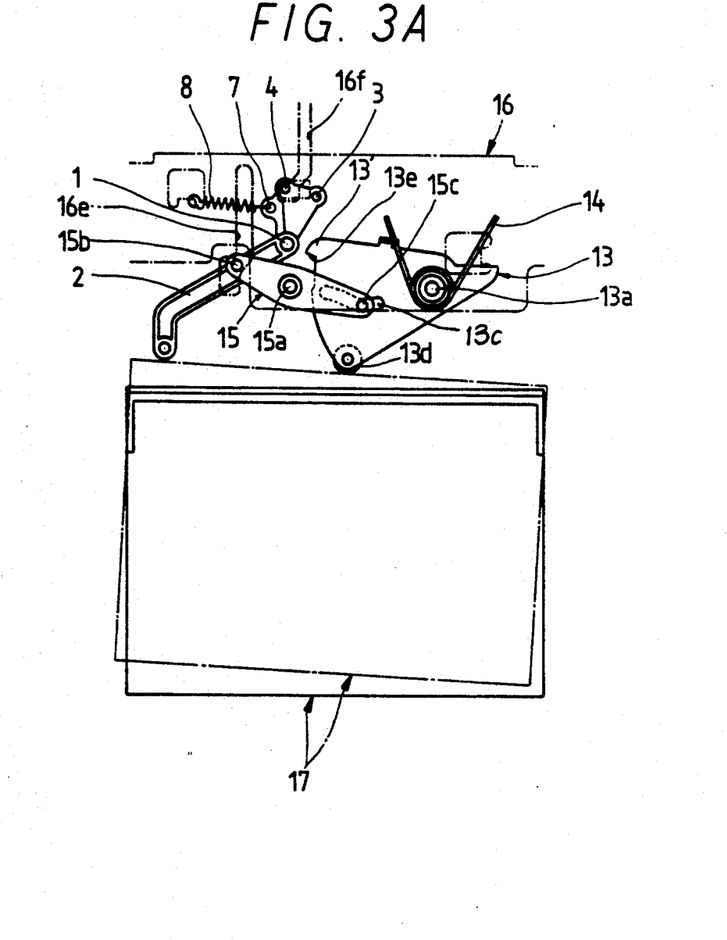
FIG. 3A is a top view showing an initial inserting position of the cassette to play or to the ejecting position after playing.
Figure 3B:
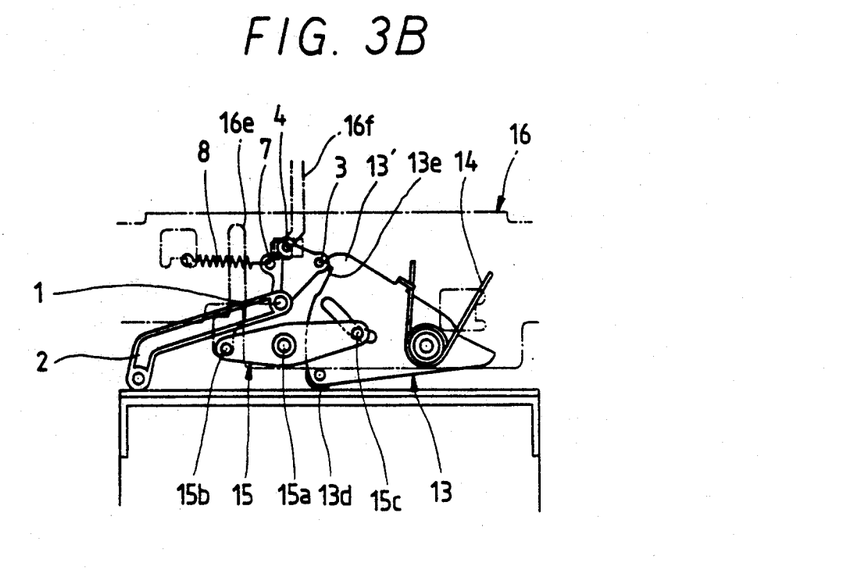
FIGS. 3B to 3D are top views showing that the cassette is inserted into the carrier, and moves with the carrier horizontally, and also showing an interaction between the ejecting lever, locking lever and a safety lever.
Figure 3C:
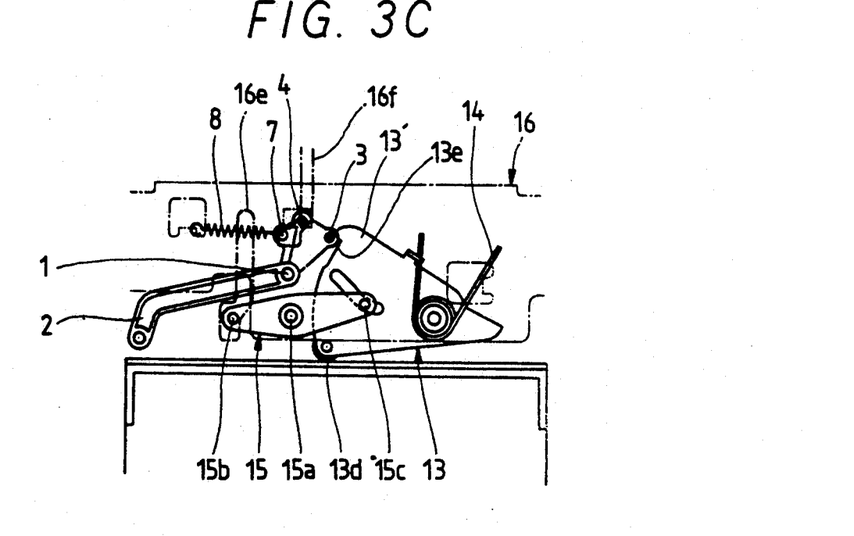
Figure 3D:
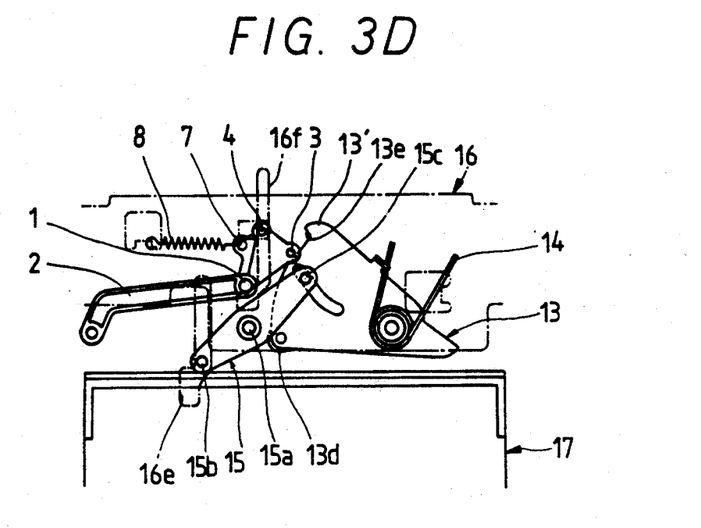
Figure 3E:
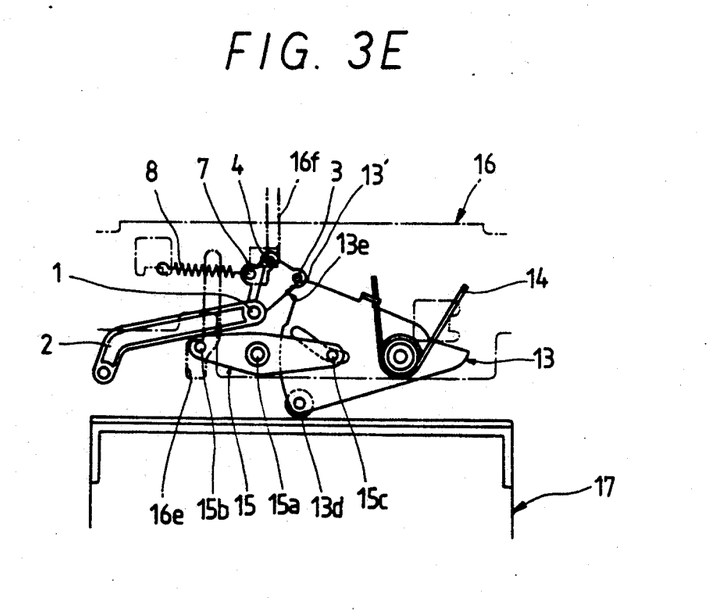
FIG. 3E is a top view showing that the cassette can not be loaded due to improver insertion.

In the above-mentioned tape cassette ejecting and loading mechanism according to the present invention, once the cassette 17 is inserted into the cassette holder 10 correctly as shown in the solid line in FIG. 3A, the cassette 17 can be loaded, unloaded, or ejected correctly.

If the cassette 17 is improperly inserted as shown in the dotted line in FIG. 3A, the safety lever 2 rotates fast to hook the hooking pin 3 of the lever 2 at the end portion 13' of the ejecting lever 13. Therefore, the cassette can not be inserted because the ejecting lever 13 can not be rotated.

Figure 4A:
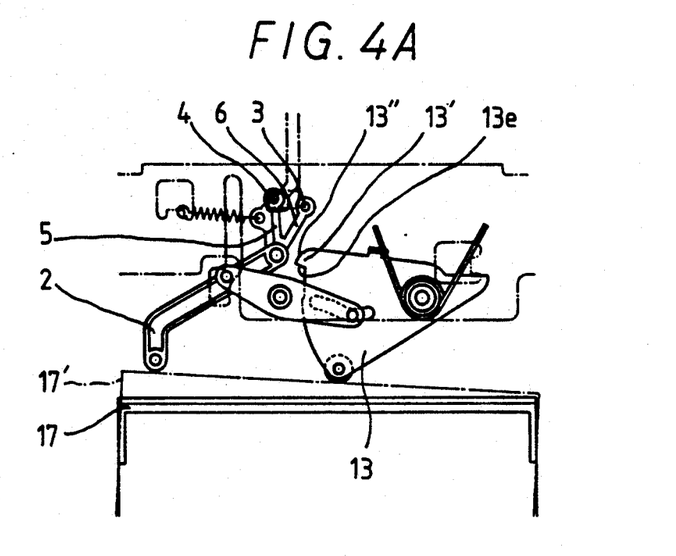
FIGS. 4A and 4B are top views of another embodiment of a tape cassette ejector in accordance with the present invention.
Figure 4B:
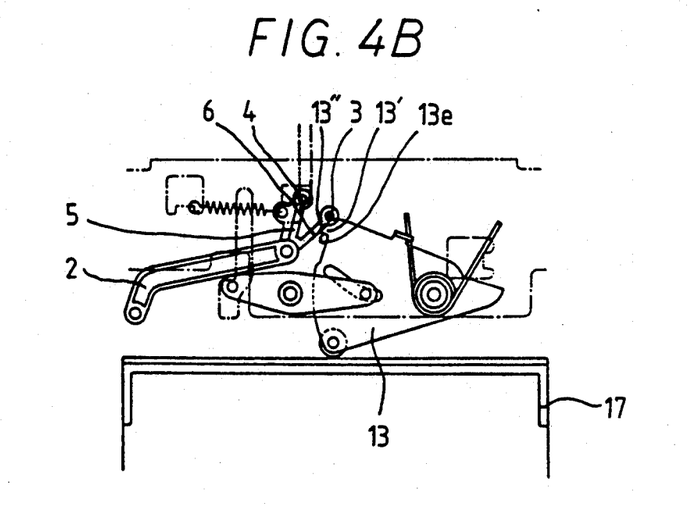
Figure 5:
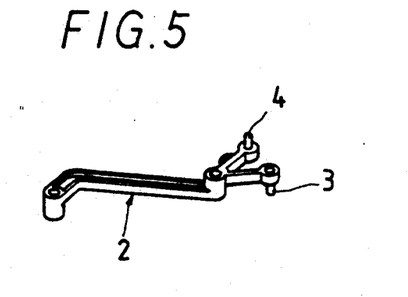
FIG. 5 is a perspective view of the safety lever of the second embodiment shown in FIGS. 4A and 4B.

FIGS. 4 and 5, disclose a second embodiment of a tape cassette ejecting and loading mechanism which solves the above-mentioned problems of the first embodiment.

As shown in FIGS. 4 and 5, first and second support stems 5,6 to which the guide pin 4 and the hooking pin 3 are secured respectively are integrally formed in "V" form at the back portion of the safety lever 2. The first support stem 5 is formed thickly, and the second support stem 6 is formed thin to have elasticity. The end portion 13' of the ejecting lever 13 is formed to be a rounded camming surface for pushing the hooking pin 3 of the safety lever 2. The safety lever 2 provided in the above second embodiment is made from synthetic resin.

According to the above second embodiment, in case the cassette 17 is improperly inserted as shown in the dotted line in FIG. 3A, the safety lever 2 rotates clockwise faster than in the case of correct inserting, and the ejecting lever 13 is also rotated clockwise to pull the hooking pin 3 by its rounded camming surface 13". The second support stem 6 is bent toward the guide pin 4 by its elasticity. However, when the end portion 13' of the lever 13 passes behind the hooking pin 3, the second support stem 6 is restored from its bent position. Therefore, the loading action of the cassette can be carried out correctly.

Other operations of the above second embodiment are similar to those of the above-mentioned first embodiment.

From the above description, it will be appreciated that, in a cassette ejecting and loading mechanism in accordance with the present invention, a tape cassette can be loaded completely in the cassette holder even if the user improperly inserts the cassette. The cassette ejecting and loading mechanism according to the present invention can be used in DAT type or VCR type front loaders.

Although preferred embodiments of the present invention have been disclosed for illustrative purpose, those skilled in the art will appreciate that various modifications, additions and substitutions are possible, without departing from the scope and spirit of the present invention as disclosed in the accompanying claims.

What is claimed is:

1. A tape cassette ejecting and loading mechanism comprising:
    a top cover;
    a horizontal carrier movably mounted under said top cover;
    and ejecting lever mounted below a lower surface of said horizontal carrier, and a first spring mounted to elastically bias said ejecting lever in a direction to eject a tape cassette out of a cassette holder;
    a locking lever mounted below said horizontal carrier, said locking lever being coupled to said ejecting lever to lock said ejecting lever and unlock said ejecting lever at loading and unloading position; and
    a safety lever mounted to a middle portion of said carrier, said safety lever having a surface engageable with said ejecting lever at a determined angular displacement of said safety lever and ejecting lever, and a second spring mounted to elastically bias said safety lever in a direction to engage said surface thereof with said ejecting lever to prevent said ejecting lever from rotating, to thereby prevent said cassette from being ejected unintentionally when a tape is initially being loaded into said mechanism.

2. The mechanism in accordance with claim 1 wherein said top cover has a first guide hole to drive said safety lever and a second for guiding said safety lever, and said safety lever includes a guide pin secured to an end portion thereof to be inserted into said guide hole and a hooking pin secured to the other end portion thereof to be hooked on a hooking portion formed on an end portion of said ejecting lever.

3. The mechanism in accordance with claim 2 wherein said safety lever is made from synthetic resin and comprises a first support stem upon which said guide pin of said safety lever is secured, and a second support stem, at which said hooking pin is secured, said second support stem being spaced from said first support stem.

4. The mechanism in accordance with claim 3 further comprising a rounded camming surface on an end portion of said ejecting lever for pushing said hooking pin of said safety lever.

5. The mechanism in accordance with claim 2 wherein said first guide hole comprises an initial guide portion, a middle guide portion, a loading guide portion, and an unloading guide portion.

6. The mechanism in accordance with claim 3 wherein said first guide hole comprises an initial guide portion, a middle guide portion, a loading guide portion and an unloading guide portion.

7. The mechanism in accordance with claim 4 wherein said first guide hole comprises an initial guide portion, a middle guide portion, a loading guide portion, and an unloading guide portion.

* * * * *